A. BECHLER.
GAGE FOR SCREW THREADS.
APPLICATION FILED AUG. 30, 1917.

1,336,189.   Patented Apr. 6, 1920.

A. Bechler, Inventor.
By his Attorney.

Witnesses

UNITED STATES PATENT OFFICE.

ANDRÉ BECHLER, OF MOUTIER, SWITZERLAND.

GAGE FOR SCREW-THREADS.

1,336,189.     Specification of Letters Patent.     Patented Apr. 6, 1920.

Application filed August 30, 1917. Serial No. 188,906.

*To all whom it may concern:*

Be it known that I, ANDRÉ BECHLER, a citizen of the Swiss Republic, residing at Moutier, Canton of Berne, Switzerland, have made certain new and useful Improvements in Gages for Screw-Threads, of which the following is a specification.

Hitherto in devices for gaging screws by means of measurements on the sides of the threads, the operation has been made by way of contact between the screw thread and surfaces having the same inclination as the said screw thread in such a manner that the thread and the surfaces aforesaid come into contact along a line; wherefore the slightest difference in the angle of inclination of the screw thread involved a comparatively great error in the measurement of the diameter of the screw which was gaged. In other devices two points of circular section (conical or oval) or two small balls, or a combination of points, or balls or prisms are made use of; the inconvenience of such improvements consists chiefly in that the result of the measurement cannot be exact unless it is taken exactly on the greatest diameter, in such a way that the axis of the points or balls crosses the axis of the screw being gaged, otherwise the operation would give the length of a span instead of the true measurement of the diameter.

On the contrary, the present invention consists in that the wedge shaped contact or gaging pieces which are applied to the sides of the screw-threads, for purpose of measurements are pivotable on an axis at right angles to the back face or base of the said wedge shaped gaging pieces and have such a form as to come into contact with the thread sides at two points only one on each side of the groove between the threads; in this manner, the measurement cannot be influenced by any error about the angle of inclination of the screw. Such an improvement always gives the mean diameter of the screw as a result of the measurement, the axis of the gaging pieces midway between the points of contact being at right angles to and crossing the axis of the screw being tested.

It will be readily understood that when measuring the mean diameter of a screw by means of small balls the penetration of the gaging points is not so great as in the case of wedge shaped or prismatically shaped pieces and it is obvious such penetration has some influence on the precision in the measurement. Again, in other devices, measurements are taken by means of three not pivotable prisms. The unreliability of such devices lies in the fact that the measurement in influenced by variation in the pitch of the threads which may be longer or shorter.

An embodiment of the present invention is illustrated in the accompanying drawing wherein, Figure 1 shows a perspective view of the parts or jaws which in the course of the measurement come into contact with the screw.

Figure 1:
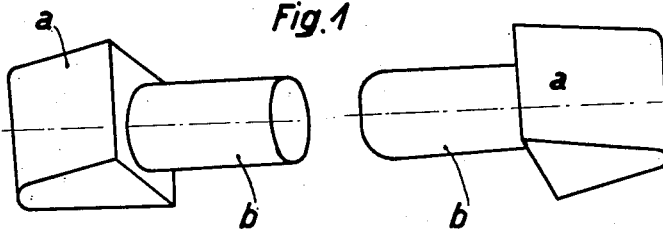
Figure 2:
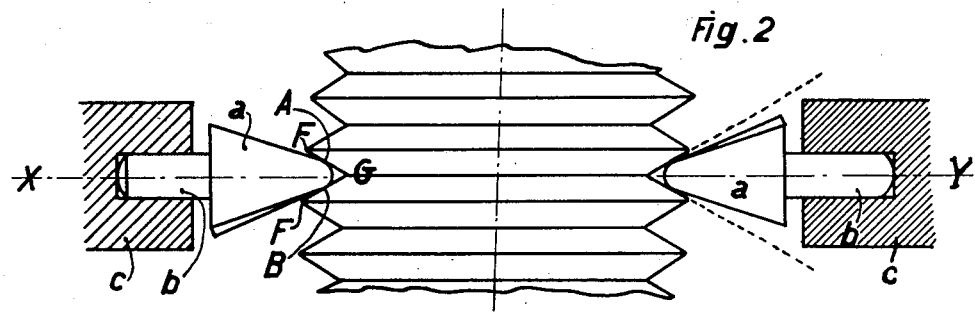
Figs. 2 and 3 show how these gaging pieces are situated during measuring operations.
Figure 3:
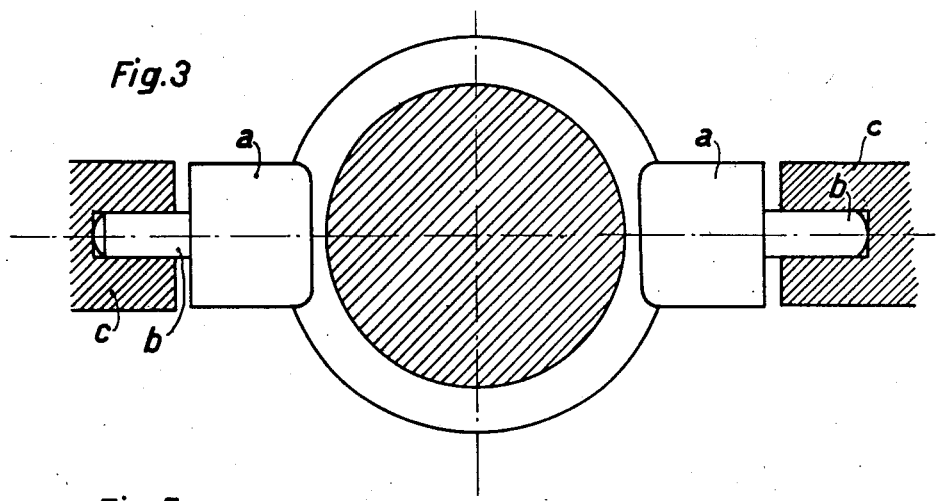

Each one of the jaws shown by the Fig. 1, consists of a small wedge shaped gaging piece *a* from the back face of which extends a cylindrical stem *b;* at right angles to this back face and used as a pivot, the two other converging faces being rounded off at the front face which is placed against the sides of the screw threads. This face presents a semi-circular surface such that the contact will be established at two points only, viz., A and B, located on the side of the thread of the screw approximately midway between the top and the bottom of the thread.

The consequence of this is that, for the purpose of gaging screws of various diameters a set of two corresponding wedge shaped gaging pieces is required for each diameter of screw to be verified. All sizes of these wedge shaped gaging pieces are provided with a cylindrical extension or stem *b* of the same diameter, which stem will be mounted in its support in such a way that it will be capable of pivoting in the support around the axis X Y and set itself parallel to lines tangential to the generating helix at the surface of the screw thread. The small wedge shaped gaging pieces of the respective sets are therefore easily changed if necessary when there are screws of different diameters to be gaged. A measuring device forming part of a screw gaging apparatus, not shown on the drawing, is used for the purpose of measuring or verifying exactly the distance between the points of contact made by the front faces of the gaging pieces and therefore the main diameter of the screw.

It is to be understood that the axis of the screw and a line passing through the points of contact made by the wedge shape gaging pieces are not in the same plane owing to the contact piece following the inclination of the screw thread, but this will not result in any error in measurement as the screw under test is verified by comparison with a standard screw measured by the same means and in the same manner.

Figure 5:
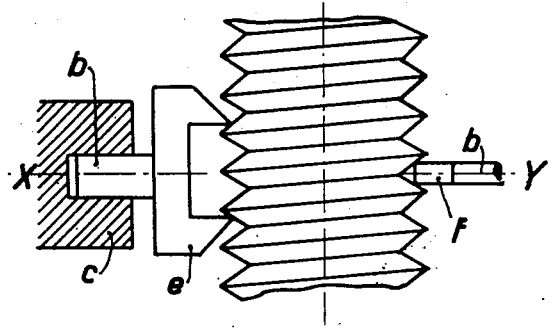
Figs. 4 and 5 are views illustrating how gaging pieces, which in their conformation are somewhat different from those shown in Fig. 1, are situated during measuring operations.
Figure 4:
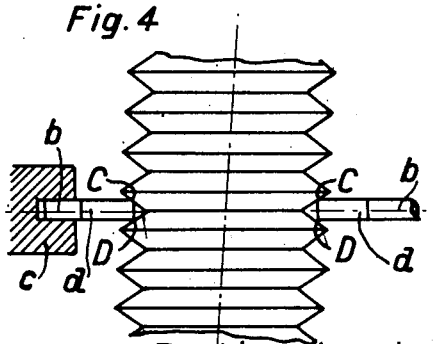

Figs. 4 and 5 show other forms of contact gaging pieces constructed so that the points of contact will rest on the sides of the screw threads. Fig. 4 shows rectangular pieces $d$ the points of contact being on the edges C D against the sides of the threads. Fig. 5 is constructed with two jaws made to span over some of the threads and having part of each outer end $e$ beveled off to form a contact edge of the pitch span required. With this latter form of construction the axis X Y of the gaging piece and the main axis of the screw being tested are at right angles to each other during the verifying operations. This construction may be used in conjunction with the form of gaging piece shown at $f$ which is of the same construction as shown in Fig. 4.

All these varied forms of construction are likewise each provided with a cylindrical extension or stem $b$, formed integral with the back face of the contact gage, such extensions or stems being always made of uniform diameter in all sizes and thus capable of being interchangeable in the holders $c$ of a screw gaging machine. The holders $c$, by means of any suitable known devices, are adjustable toward and away from each other, to allow screws of various sizes to be gaged between the pieces $a$.

In every case the contact with the screw thread will be established at two points only, one on either side of the V between threads and located approximately on the mean diameter of the screw.

The operation for verifying the mean diameter of a screw is as follows:—The standard screw gage is first mounted in position for gaging and the gaging pieces are brought into proper contact with the threads and the measurements noted on the measuring device forming part of the screw gaging apparatus in which the gaging pieces are pivotally mounted in their respective holders, being thus mounted that they may each adapt itself to inclination of the screw-thread. The one holder which may be called the back holder can now be held fixed in position while the other or front holder on the measuring side can be slacked back, the standard gage removed and replaced by the screw to be tested or verified, and when the gaging piece is afterward applied to this screw, any variation in the diameter compared with the standard gage will be registered on the above mentioned measuring device.

What I claim is:—

1. A screw gaging device comprising in combination, a pair of adjustable holders and a gaging piece pivotally carried by each holder, the front face of each gaging piece contacting with the screw to be gaged and by such contact being turned to the inclination of the thread.

2. A screw gaging device comprising in combination, a pair of adjustable holders, and a gaging piece pivotally carried by each holder, the front face of each gaging piece contacting with the sides of the screw thread to be gaged only at approximately midway between the top and bottom of the thread.

3. A screw gaging device comprising in combination, a pair of adjustable holders with inwardly facing recesses therein and two gaging pieces each provided with an integral cylindrical stem extending from the back of the gaging piece and pivotally fitting in the recess formed in the holder in which it is mounted.

4. A screw gaging device comprising in combination, a pair of adjustable holders, and a gaging piece pivotally carried in each holder and so constructed that the two points of contact are situated one on each of different threads, and the axis of the contacting faces is at right angles to the main axis of the screw which is being gaged.

5. A screw gaging device comprising in combination, a pair of adjustable holders and, in each holder, a pivotally mounted gaging piece of wedge shape with plain back and ends and front face rounded off to a semi-circular form, the diameter of which is equal to the width between threads on the mean diameter of a standard screw gage used for comparison when verifying other screws.

In testimony whereof I have signed my name to this specification in the presence of two subscribing witnesses.

ANDRÉ BECHLER.

Witnesses:
JULIA DURST,
FRIDA SALADIN.